Sept. 10, 1974  W. TIETZE  3,834,942
SEALED GALVANIC BATTERY CELL AND METHOD FOR ITS MANUFACTURE
Filed June 28, 1971  2 Sheets-Sheet 1

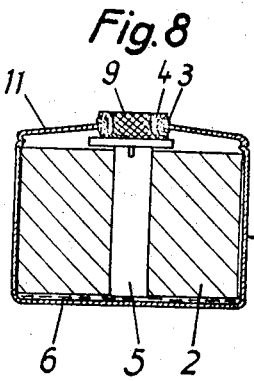
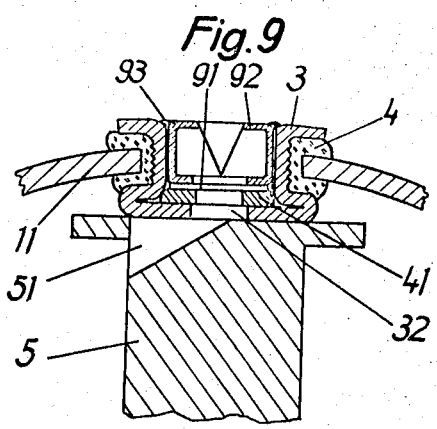
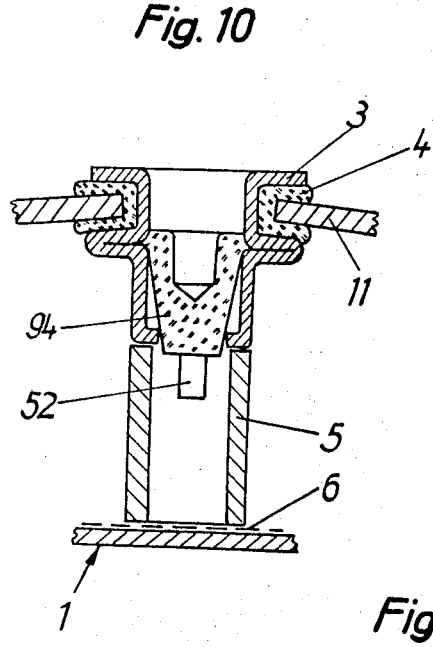
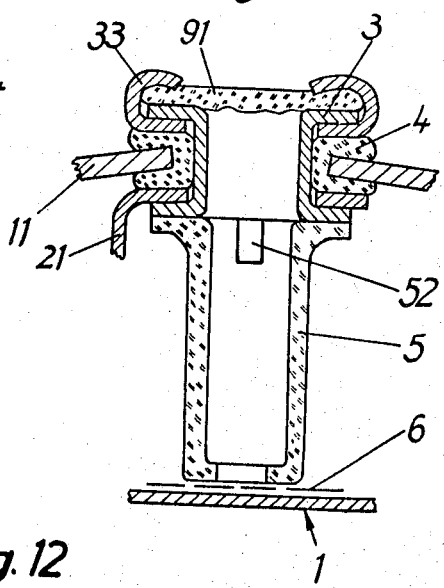
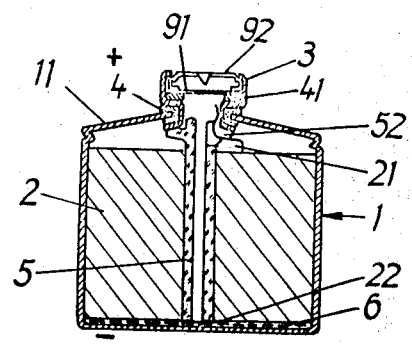

United States Patent Office 3,834,942
Patented Sept. 10, 1974

3,834,942
SEALED GALVANIC BATTERY CELL AND
METHOD FOR ITS MANUFACTURE
Werner Tietze, Hagen, Germany, assignor to
Varta Aktiengesellschaft
Filed June 28, 1971, Ser. No. 157,556
Claims priority, application Germany, June 26, 1970,
P 20 31 714.0
Int. Cl. H01m 35/04
U.S. Cl. 136—14
9 Claims

ABSTRACT OF THE DISCLOSURE

In a sealed galvanic battery cell, such as an accumulator cell, the electrode set is accommodated in a can or the like tubular container which, with respect to its originally straight axial length, protrudes over the inserted electrode set. The protruding top portion of the container is plastically deformed toward the axis so as to form an end cover integral with the main portion of the container. An annular contact rivet is gas-and-liquid tightly inserted into a central opening of the end cover. The cell is produced by first inserting the electrode set into the container, placing the annular rivet onto a mandrel portion axially protruding from the set, and then deforming the top portion of the container toward the center into engagement with the annular rivet which contains electrically insulating and sealing means.

---

My invention relates to gas-tightly sealed galvanic cells and more particularly, although not exclusively, two storage batteries.

There are known gas-tightly sealed galvanic cells whose deep-drawn cylindrical cell containers are closed by a separately produced cover. The cell containers and covers, as a rule, consist of electrically conducting material and serve in most cases also as current conducting terminals. Since cell container and cover have respectively different electrical potentials, they must be insulated from each other. The manufacture of such cell containers is relatively expensive because the cover and container are produced separately from each other, and the cover construction must meet exact demands as to insulating and sealing ability. This particularly applies to cells that must be gas-tight and liquid-proof as is the case with alkaline and other electrolytic batteries.

Theoretically gas-tight galvanic cells operate at low internal pressures of about 0.2–0.5 atm. above ambient. In practice, however, these values are exceeded in most cases, for example when the gas development within the cell becomes so intense that not all of the evolving gases can be consumed internally. To relieve such overpressures sufficiently early and to prevent the hazard of explosive destruction of the cell, additional safety devices are provided which respond only when the permissible internal pressure is exceeded. The safety devices operate either as a valve or are designed as a destructible diaphragm which is destroyed with the aid of a pointed member. The safety devices are supposed to require the least amount of space possible and, as to proper functioning, must be adapted to the entire cell construction. In a cell container with a separate cover, the safety device is accommodated in the cover which, therefore, must be given a special design. This leads to an increase in manufacturing cost.

It is an object of my invention to minimize or fully eliminate such disadvantages of the known cells.

More specifically it is an object of the invention to devise a cell with a container whose jacket portion, bottom portion and cover consist of a single piece of material.

Another object of the invention is to simplify and improve the provision of an overpressure safety device.

Still another object of the invention is to improve and increase the reliability of the gas-and-electrolyte tight sealing of the galvanic cell by minimizing the area to be sealed.

To achieve these objects, and in accordance with a feature of my invention, I provide a storage-battery or other galvanic cell with a tubular container which is open at least at one end and preferably consists of a metal can as customary for galvanic cells, the original axial length of the container being so large that the top portion of the container protrudes beyond the inserted electrode set. The end cover, namely the top and/or the bottom of the container is then produced by plastic deformation of the protruding container portion, and a tubular contact rivet is gas-and-liquid tightly inserted into the central opening of the cover thus formed.

The foregoing and other objects and features of my invention, said features being set forth with particularity in the claims annexed hereto, will be apparent from and will be described in the following with reference to embodiments of galvanic cells according to the invention illustrated by way of example on the accompanying drawings in which:

FIG. 8 is a sectional view of a further embodiment equipped with a pressure relief valve.

FIG. 9 shows separately and in section the details of the pressure relief valve corresponding to FIG. 8.

FIGS. 10 and 11 are sectional views of two further embodiments of a pressure relief valve for a cell according to the invention.

FIG. 12 is a schematical and sectional view of another embodiment equipped with a pressure-relief valve.

Figure 1:
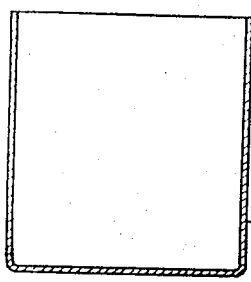
FIG. 1 is a diagonal cross section of a tubular cell container.

Referring to FIG. 1, the illustrated can has the shape of a generally cylindrical cup open at one end. The axial length of the can is greater than that of the electrode set or package to be inserted into the can. Consequently, the top portion of the can 1 protrudes upwardly above the electrode set.

Figure 2:
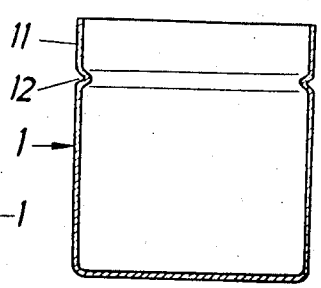
FIG. 2 shows the same container with a crease crimped into the container wall near the open edge.
Figure 3:
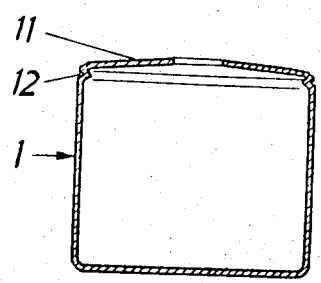
FIG. 3 shows the same can after formation of the top portion into an end cover.

According to FIG. 2 a single, peripheral crease 12 is crimped, for example by pressing or rolling, into the wall of the can. Thereafter the top portion 11 is deformed inwardly toward the axis to the shape illustrated in FIG. 3. It will be seen that the end cover 11 thus formed leaves an opening in center through which the inserted electrode set is to be electrically accessible from the outside, the can then forming the second terminal member of the cell assembly. The crease 12 defines the peripheral area where the original shape of the can 1 merges with the end cover 11.

Figure 4:
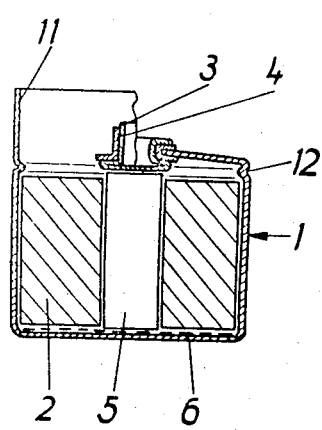
FIG. 4 illustrates schematically and in section two stages in the production of a valveless gas-tight Ni-Cd storage battery of cylindrical shape.

The cylindrical embodiment of a valveless gas-tight Ni-Cd storage battery (accumulator) cell of cylindrical shape shown in FIG. 4 will elucidate the manufacture as well as the ultimate configuration of the cell. Shown in the left half-portion of the illustration is a pre-assembled cell. The right-hand portion of the same illustration shows the completed and sealed cell. The electrode set or active mass 2 may fill the interior space up to the crease 12. Before the cover is formed by deformation, an annular contact rivet 3 is placed upon a mandrel 5 which is coaxially located in the electrode set and slightly protrudes upwardly therefrom. The contact rivet has originally an L-shaped cross-section (left-hand portion of FIG. 4) and is surrounded by an insulating and sealing ring 4. During the following formation of the cover, the mandrel 5 forms an abutment for the contact rivet 3, and thereafter serves as an anvil for the subsequent pressing operation which deforms the original L-shaped cross-section of the rivet to a U-shaped configuration which straddles the edge of the end cover and compresses the insulating ring 4 between rivet and cover (right-hand portion of FIG. 4). An insulator 6 is inserted between the electrode set 2 and the bottom of the container.

Figures 5, 6:
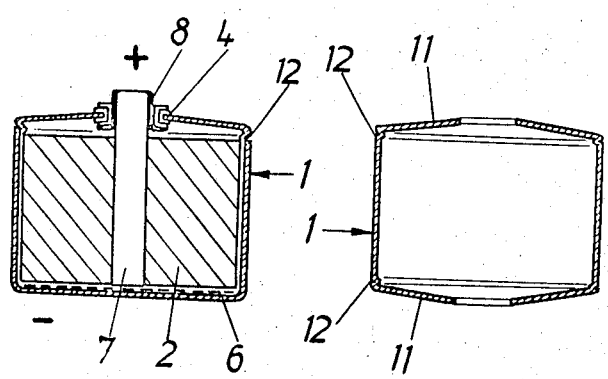
FIG. 5 shows another embodiment particularly suitable for primary battery cells.
FIG. 6 is a sectional view of a further embodiment, in which both the top and the bottom of the container are produced by deforming an originally straight cylindrical tube.
Figure 7:
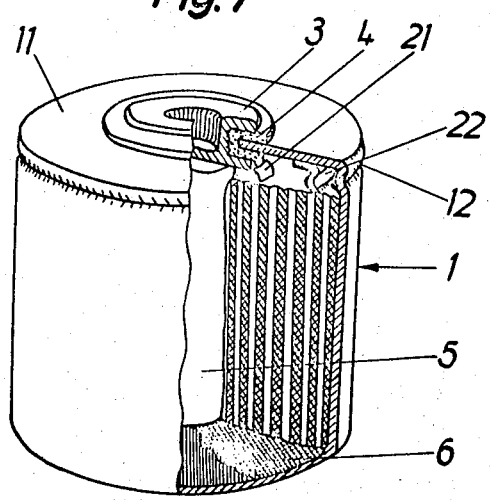
FIG. 7 is a persepective and partly sectional view of a Ni-Cd storage battery cell generally similar to FIG. 4.

The embodiment shown in FIG. 5 is mainly intended for primary battery cells. The contact rivet 8 is so shaped from the outset that it arrests the graphite electrode 7 and also constitutes part of a contact cap which forms the positive terminal, the negative terminal being constituted by the can 1.

In the modification shown in FIG. 6 the tubular housing 1 is originally open at both ends. It is provided with respective peripheral crimps 12 in the merger region between the jacket portion and the respective end portions which form the cover and bottom of the finished cell. After deforming the two end covers by rolling, upsetting or other suitable operation, the openings remaining in the center of the cover portions are applicable for the passage of the pole terminal members. Depending upon the intended use, the members passing through the openings may have the same polarity in which case the cell container has the opposite polarity. In a potential-free container, for example if the housing is made of synthetic plastic material, respective positive and negative connections may pass through the two respective openings.

Shown in FIG. 11 is a cylindrical gas-tight Ni-Cd storage battery cell with wound sinter-foil electrodes. As to design and manufacture this embodiment largely corresponds to that of FIG. 4, the cell container being shown partially cut away to expose details of the interior. The mandrel 5 of the cell is made of synthetic plastic and has a length suitable for utilizing it as an anvil for the formation and compression of the annular rivet. A positive plate connector 21 is galvanically connected with the contact rivet, and a corresponding negative plate connector 22 is connected with the container main portion 1.

FIG. 8 shows a gas-tight galvanic cell according to the invention whose container has a cover produced by rolling, pressing, upsetting or the like forming operations, so that the resulting cover forms the top of the container. The center opening remaining in cover 11 is engaged in the described manner by an annular contact rivet which constitutes an insulated electric terminal of the electrode set and is provided with an inserted pressure relief valve 9.

Details of such a valve are illustrated in FIG. 9. This particular valve serves simultaneously as a closure of a contact rivet 3 which serves to carry current to or from the electrode set. The bottom of the contact rivet 3 has a gas passage 32 upon which is placed a sealing ring 41 of synthetic material or rubber. Located on top of the sealing ring is a destructable diaphragm as well as a closure cap 92 which holds the ring 41 and diaphragm 91 in place and is provided with a sharp point for destroying the diaphragm 91 if, upon occurrence of a given internal pressure, the diaphragm bulges upwardly. The lower edge of the closure cap forms a sufficient abutment face to prevent the diaphragm 91, located beneath the abutment face, from being destroyed when the relief valve 9 is being assembled. The valve 9 becomes compressed upon occurrence of the precalculated internal pressure. The closure cap 92 in contact rivet 3 is kept under mechanical tension by means of three or more pointed stops 93. The same arresting effect can also be obtained by correspondingly providing pointed protuberances on the contact rivet 3. The mandrel 5 required for the rivetting of the contact rivet 3 serves as an anvil and, in this embodiment, is produced of synthetic plastic. The mandrel 5 has gas passages 51 which may be arranged radially and also axially.

The fragmentary illustration in FIG. 10 of part of a cell according to the invention, shows a modified and simplified safety valve. The lower portion of the contact rivet 3, in contrast to the corresponding rivets shown in the preceding figures, is given a downward extension which accommodates a stopper 94. After being pressed into a contact rivet, the stopper will spread and thus become clamped in the bottom fold of the rivet 3. The mandrel 5 in this example has a tubular design and is provided with gas inlet and outlet openings 52.

For more securely holding the stopper 94, the embodiment according to FIG. 10 may be supplemented by providing the contact rivet 3 with a closure cap similar to the one shown at 92 in FIG. 9 but not containing a pointed protrusion. The elastic stopper 94 seals the bottom portion of the downwardly extended contact rivet 3 up to a predetermined internal pressure. After this pressure is exceeded, the stopper becomes so compressed that gas can escape from the interior of the cell. Upon occurrence of pressure equalization, the stopper 94 again closes and seals the contact rivet 3 so that the cell remains gas-tight.

The embodiment according to FIG. 11 is likewise provided with a pressure safety valve within the tubular contact rivet 3. In principle, this arrangement of the insulated pole lead-in connection corresponds to the above-described other embodiments except for the addition of a few components. Among these is a plate-current connector 21 which is riveted between the sealing ring 4 and the lower flange of the contact rivet 3. The connector 21 serves as a current conductor for connecting one pole of the electrode set with the rivet 3 and consequently with the outside. In a cylindrical gas-tight storage cell, the connector 21 may form the positive terminal connection. After complete rivetting of the contact rivet 3, a claw ring 33 straddles an elastic safety diaphragm 92. The same claw ring 33 may also form part of the current conductor path which connects the electrode set with the outside. In this example, the mandrel 5 with gas inlet openings 52 is injection-molded of synthetic plastic material and has a top flange for better support of the contact rivet 3 during crimping and rivetting operation. If a cylindrical gas-tight storage battery cell similar to the cell of FIG. 11 is required to meet national or international standards and hence must contain a so-called contact button, such a button may be fastened with the aid of the claw ring 33 to the pole lead-in structure, a contact button being shown at 8 in FIG. 5.

The gas-tightly sealed storage battery cell shown in FIG. 12 comprises an upwardly protruding safety pressure valve 9. This embodiment is further provided with another modification of the positive and negative plate current conductors 21 and 22. The negative current conductor 22 is located at the cell bottom and the positive plate current conductor 21 is situated at the bottom of the contact rivet 3 to which it may be connected by point welding or the like. The reference numerals in FIG. 12 correspond to those of respectively similar elements in FIGS. 8 to 11.

Among the outstanding advantages of a gas tightly sealed galvanic cell according to the invention are the comparatively slight amount of work and equipment needed for the production of the cell container, the simple accommodation of an excess-pressure valve in the contact rivet of the cover integrally formed from the material of the container, as well as a particularly good and reliable seal with respect to gas and electrolyte by virtue of the slight area to be sealed between contact rivet and cover.

Upon a study of this disclosure it will be apparent to those skilled in the art that my invention permits of various modifications other than those particularly illustrated and described herein, without departing from the essential features of the invention and within the scope of the claims annexed hereto.

I claim:

1. A sealed galvanic battery cell comprising an electrode set, a tubular container having a cylindrical main portion into which said electrode set is coaxially seated, said container having an end portion deformed toward the axis so as to form an end cover integral with said main portion of said container, said end cover extending substantially over the entire longitudinal end of said tubular container such that said electrode set is required to be inserted into said tubular container before said end portion is deformed to form said end cover, said end cover having a central opening defined by a circular edge of said end cover said electrode assembly having a central rod-like member, an annular rivet passing with clearance through said central opening and located at an end of said rod-like member, said annular rivet having a cross section stradding the circular edge, and sealing means disposed in the clearance between said contact rivet and said circular edge and in tight-fitting engagement therewith so as to seal said contact rivet in said central opening with a gas-tight and liquid-tight seal.

2. A sealed galvanic cell according to claim 1, wherein said rod-like member is a mandrel coaxially seated in said electrode set and protruding therefrom, said mandrel forming an abutment for said contact rivet.

3. In a sealed galvanic cell according to claim 2, said container being cup-shaped and having a circumferential crimp at which said cylindrical main protion merges with said integral end cover.

4. A sealed galvanic cell according to claim 1, comprising a pressure relief valve in said contact rivet.

5. In a sealed galvanic cell according to claim 4, said valve comprising a destruct diaphragm and a pressure-responsive point member for piercing said diaphragm.

6. A sealed battery cell comprising an electrode assembly, a metal can in which said assembly is coaxially seated, said can having a length which, when straight, protrudes beyond the axial length of said electrode assembly, the protruding portion of said can being deformed inwardly toward the can axis and forming a top cover integral with the can, said top cover extending substantially over the entire longitudinal end of said can such that said assembly is required to be inserted into said can before said protruding portion of said can is deformed to form said top cover, said top cover having a central opening defined by a circular edge of said top cover, said electrode assembly having a central mandrel, an annular rivet passing with clearance through said circular opening, said annular rivet coaxially surrounding said mandrel and having a U-shaped cross-section straddling the circular edge defining said opening of said cover, and electrically insulating sealing means disposed peripherally in the clearance between said rivet and said cover edge, in tight-fitting engagement therewith and located in the bight portion of said U-shaped cross-section.

7. The method of producing a sealed galvanic battery cell having a tubular container with an electrode set having a central mandrel coaxially seated in the container, comprising the steps of joining the electrode set with a straight tubular can which protrudes axially beyond the electrode set, placing an annular rivet with peripheral insulating and sealing means onto the mandrel, then plastically deforming the protruding top portion of the can toward the axis such that the peripheral edge of said protruding top portion is in peripheral engagement with the insulating and sealing means of the annual rivet, the mandrel forming an abutment for the rivet during the deforming step, the plastically deformed top portion thereby forming an end cover with a central opening through which the electrode set is electrically contactable from the outside.

8. The method according to claim 7 which comprises crimping the container peripherally before deforming the top portion, the crimp being made in the merger zone between the deformed top portion and the cylindrical wall portion of the container.

9. The method according to claim 7, wherein the rivet, when being placed upon the mandrel, has an L-shaped cross-section, and which comprises compressing the rivet after forming the cover so as to convert the L-shape to a U-shape which straddles the edge of the central opening.

References Cited
UNITED STATES PATENTS

| | | | |
|---|---|---|---|
| 3,096,216 | 7/1963 | Warren | 136—6 GV |
| 3,116,172 | 12/1963 | Wilke et al. | 136—107 |
| 3,556,848 | 1/1971 | Ruetschi | 236—6 R |
| 3,622,397 | 11/1971 | Belove | 136—6 GC |

ALLEN B. CURTIS, Primary Examiner

C. F. LE FEVOUR, Assistant Examiner

U.S. Cl. X.R.

136—6 GV, 6 R, 107